United States Patent [19]

Dessaint

[11] 4,366,299
[45] Dec. 28, 1982

[54] COPOLYMERS CONTAINING FLUORINE AND THEIR USE FOR THE WATER-REPELLENT AND OIL-REPELLENT TREATMENT OF VARIOUS SUBSTRATES

[75] Inventor: André L. Dessaint, Clermont, France

[73] Assignee: P C U K Produits Chimiques Ugine Kuhlmann, Courbevoie, France

[21] Appl. No.: 228,826

[22] Filed: Jan. 27, 1981

[30] Foreign Application Priority Data

Feb. 19, 1980 [FR] France ............................. 80 03566

[51] Int. Cl.³ ..................................... C08F 220/22
[52] U.S. Cl. ................................. 526/243; 428/422; 525/326.2; 526/245; 526/246
[58] Field of Search ..................... 526/245, 246, 243; 525/329

[56] References Cited

U.S. PATENT DOCUMENTS

| 3,455,889 | 7/1969 | Coleman | 526/245 |
| 3,474,079 | 10/1969 | Fein et al. | 526/245 |
| 3,838,104 | 9/1974 | Hayashi et al. | 526/243 |
| 3,910,862 | 10/1975 | Barabas et al. | 525/329 |
| 4,127,711 | 11/1978 | Lore et al. | 526/245 |
| 4,147,851 | 4/1979 | Raynolds | 526/245 |

FOREIGN PATENT DOCUMENTS 1190106  4/1970  United Kingdom .

Primary Examiner—Harry Wong, Jr.
Attorney, Agent, or Firm—Beveridge, DeGrandi and Kline

[57] ABSTRACT

The invention relates to fluorinated copolymers and their application to the waterproofing and oil-resistance treatment of various substrates. These copolymers comprise by weight:

(a) 35 to 98% of a monomer or monomers of the formula:

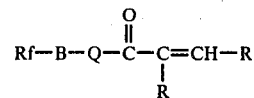

in which Rf is a perfluoro radical, Q is an oxygen or sulfur atom, B is a bivalent chain linked to Q by a carbon atom, one of the symbols R is a hydrogen atom and the other a hydrogen atom or an alkyl radical:

(b) 1 to 15% of a monomer or monomers of the formula:

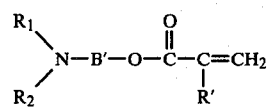

in which B' is an alkylene radical, R' is a hydrogen atom or an alkyl radical, $R_1$ is an alkyl, hydroxyethyl or benzyl radical, $R_2$ is a hydrogen atom or an alkyl, hydroxyethyl or benzyl radical or $R_1$ and $R_2$, together with the nitrogen atom, form a heterocyclic radical:

(c) 1 to 50% of a monomer or monomers of the formula:

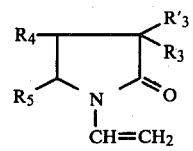

in which $R_3$, $R'_3$, $R_4$ and $R_5$ are hydrogen atoms or alkyl radicals; and possibly (d) up to 10% of any other monomer.

These copolymers are particularly well adapted to the waterproofing and oil-proofing of paper and similar articles.

9 Claims, No Drawings

COPOLYMERS CONTAINING FLUORINE AND THEIR USE FOR THE WATER-REPELLENT AND OIL-REPELLENT TREATMENT OF VARIOUS SUBSTRATES

The present invention relates to new copolymers containing fluorine and their use for the coating and impregnation of various substrates such as textiles, leathers, wood, non-woven materials, metals, concrete and, more particularly, papers and similar articles for making them oil and water repellent.

A number of fluorine derivatives have already been proposed in order to obtain these properties. However, although these derivatives have good properties on textiles and on leather, it is necessary in order to obtain these same properties on papers and similar materials to use very large amounts of active substance (i.e. the proportion of fluorine connected to the carbon) so as to obtain acceptable economic performances.

In French Pat. Nos. 1,172,664 and 2,022,351, the latter corresponding to U.S. Pat. No. 3,641,083, and in U.S. Pat. No. 3,907,576 chromium complexes have been proposed as products more especially adapted to papers. These complexes, however, which give effective oil-repellent properties to papers and similar articles, have the disadvantage of being of green color and of communicating this color to the substrates to which they are applied, thus restricting their use.

There have also been proposed for use in paper-making polyfluoroalkyl or cycloalkyl phosphates (French Pat. No. 1,305,612 (corresponds to U.S. Pat. Nos. 3,096,207 and 3,112,241), French Pat. No. 1,317,427 (corresponds to U.S. Pat. No. 3,094,547), French Pat. No. 1,388,621 (corresponds to U.S. Pat. No. 3,083,224), French Pat. No. 2,055,551 (corresponds to U.S. Pat. No. 3,812,217), French Pat. No. 2,057,793 (corresponds to U.S. Pat. No. 3,692,885) and French Pat. No. 2,374,327 (corresponds to U.S. Pat. No. 4,145,382), U.S. Pat. Nos. 3,083,224 and 3,817,958, and German Pat. No. 2,405,042) and hydroxypropyl polyfluoroalkyl phosphates (U.S. Pat. No. 3,919,361). However, these products which confer good oil-repellent properties on the papers have, on the other hand, the serious defect that they do not give them any waterproofing property. Owing to this, papers treated with these products have no protection against aqueous products. Further, these products have no sizing power and very greatly reduce the efficiency of sizing agents, thus hindering their suitability for writing and printing.

In addition, salified and N-oxidized copolymers of perfluoroaliphatic acrylic or mathacrylic esters and dialkylaminoalkyl acrylic or methacrylic esters (U.S. Pat. No. 4,147,851) have been proposed for the treatment of papers and similar articles. Nevertheless, in order to confer good oil-repellent properties on the papers and similar articles to which they are applied, these copolymers must be used with high doses of active material. In addition, they only provide very weak water-repellent properties.

There have now been found by applicant new fluorine products which, when applied to papers and similar articles, give them both an excellent sizing strength and very good water- and oil-repellent properties, with only a small amount of fluorine deposited, so that the papers and similar articles treated with these products show a veritable "barrier effect" to water and to organic solvents, that is they prevent the penetration of liquids of aqueous or oily origin, fats and numerous organic solvents. In addition, when applied to other very diverse substrates such as those previously mentioned, these new products also confer on them very good oil- and water-repellent properties.

The products according to the invention are copolymers, possibly salified or quaternized, which comprise by weight:

(a) 35 to 98%, preferably 69 to 93%, of one or more polyfluorinated monomers of the general formula:

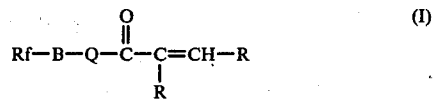

in which Rf represents a straight or branched chain perfluoroalkyl radical containing 2 to 20 carbon atoms, preferably 4 to 16 carbon atoms, Q represents an oxygen or sulfur atom, B represents a bivalent chain connected to Q by a carbon atom and able to contain one or more oxygen, sulfur and/or nitrogen atoms, one of the symbols R represents a hydrogen atom and the other a hydrogen atom or an alkyl radical containing 1 to 4 carbon atoms;

(b) 1 to 15%, preferably 5 to 11% and especially 7 to 10% of one or more monomers of the general formula:

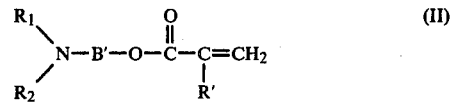

in which B' represents a linear or branched alkylene radical containing 1 to 4 carbon atoms, R' represents a hydrogen atom or an alkyl radical containing 1 to 4 carbon atoms, $R_1$ represents an alkyl radical containing 1 to 18 carbon atoms, a hydroxyethyl radical or a benzyl radical, $R_2$ represents a hydrogen atom or an alkyl radical containing 1 to 18 carbon atoms, hydroxyethyl or benzyl radical, or $R_1$ and $R_2$ together with the nitrogen atom form a morpholino, piperidino or 1-pyrrolidinyl radical;

(c) 1 to 50%, preferably 2 to 20%, of one or more monomers of the general formula:

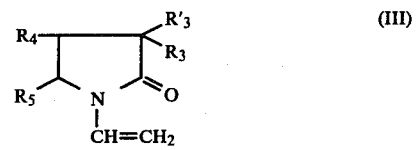

in which $R_3$, $R'_3$, $R_4$ and $R_5$ are the same or different and each represents a hydrogen atom or an alkyl radical containing 1 to 4 carbon atoms; and possibly (d) up to 10%, preferably less than 5%, of any monomer other than the monomers of formulae (I), (II) and (III), which is copolymerizable with said monomers of formulae (I), (II) and (III).

Polyfluorinated monomers of formula (I) are preferably those corresponding to the formula:

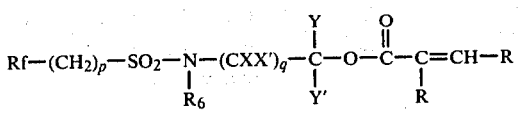

(IV)

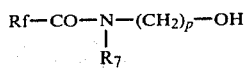

(XVI)

in which Rf and R have the same significance as above, p represents a whole number from 1 to 20, preferably equal to 2 or 4, q represents a whole number from 1 to 4, preferably equal to 1 or 2, $R_6$ represents a hydrogen atom or an alkyl radical containing 1 to 10 carbon atoms (preferably methyl), a cycloalkyl radical containing 5 to 12 carbon atoms, a hydroxyalkyl radical containing 2 to 4 carbon atoms or an aryl radical (preferably phenyl) possibly substituted by an alkyl radical containing 1 to 6 carbon atoms, X, X', Y and Y' are the same or different and each represents a hydrogen atom or an alkyl radical containing 1 to 4 carbon atoms. These monomers may be prepared by known processes, for example by esterification of the corresponding alcohols of the formula:

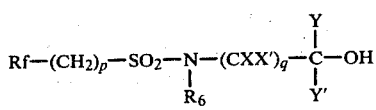

(V)

described in French Pat. No. 2,034,142, which corresponds to British Pat. No. 1,298,291, by means of an alkenemonocarboxylic acid of the formula:

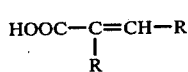

(VI)

such as, for example, acrylic acid, methacrylic acid and crotonic acid, in the presence of acid catalysts such as sulfuric acid or p-toluenesulfonic acid. Instead of the alkene-monocarboxylic acids of formula (VI), their esters, anhydrides or halides may also be used. For practical and economic reasons, it has proved particularly advantageous to use a mixture of monomers of formula (IV) having different Rf radicals.

Other examples of polyfluorinated monomers of formula (I) which may be mentioned are the esters of acids of formula (VI) with alcohols and thiols of the formulae:

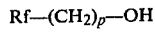 (VII)

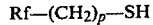 (VIII)

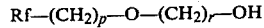 (IX)

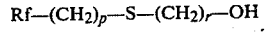 (X)

 (XI)

 (XII)

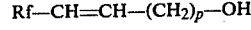 (XIII)

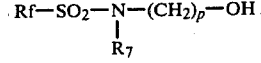 (XIV)

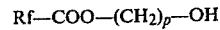 (XV)

in which Rf and p have the same significance as above, $R_7$ represents a hydrogen atom or an alkyl radical containing 1 to 4 carbon atoms and r is a whole number from 1 to 20, preferably 1 to 4.

Examples of monomers of formula (II) which may be mentioned more particularly are the acrylates and methacrylates of the following amino-alcohols: 2-dimethylamino-ethanol, 2-diethylamino-ethanol, 2-dipropylamino-ethanol, 2-di-isobutylamino-ethanol, N-tert.-butyl-N-methyl-2-amino-ethanol, 2-morpholino-ethanol, N-methyl-N-dodecyl-2-amino-ethanol, N-ethyl-N-octadecyl-2-amino-ethanol, N-ethyl-N-(2-ethyl-hexyl)-2-amino-ethanol, 2-piperidino-ethanol, 2-(1-pyrrolidinyl)-ethanol, 3-diethylamino-1-propanol, 2-diethylamino-1-propanol, 1-dimethylamino-2-propanol, 4-diethylamino-1-butanol, 4-diisobutylamino-1-butanol, 1-dimethylamino-2-butanol, 4-diethylamino-2-butanol, and 2-tert-butylamino-ethanol. These esters may be prepared, for example, according to the method described in U.S. Pat. No. 2,138,763.

Examples of monomers of formula (III) which may be mentioned more particularly are N-vinyl-2-pyrrolidone, N-vinyl-3-methyl-2-pyrrolidone, N-vinyl-4-methyl-2-pyrrolidone, N-vinyl-5-methyl-2-pyrrolidone and N-vinyl-3,3-dimethyl-2-pyrrolidone, N-vinyl-2-pyrrolidone being preferred.

Other monomers (d) which may also be used within the scope of the present invention are:

Lower olefin hydrocarbons, halogenated or not, such as ethylene, propylene, isobutene, 3-chloro-1-isobutene, butadiene, isoprene, chloro- and dichloro-butadienes, fluoro- and difluorobutadienes, 2,5-dimethyl-1,5-hexadiene, and diisobutylene;

Vinyl, allyl or vinylidene halides such as vinyl or vinylidene chloride, vinyl or vinylidene fluoride, allyl bromide, and methallyl chloride;

Styrene and its derivatives, such as vinyl-toluene, α-methyl-styrene, α-cyanomethyl-styrene, divinyl-benzene and N-vinyl-carbazole;

Vinyl esters such as vinyl acetate, vinyl propionate, vinyl esters of the acids known in the art by the name of "Versatic acids", vinyl isobutyrate, vinyl senecioate, vinyl succinate, vinyl isodecanoate, vinyl stearate and divinyl carbonate;

Allyl esters such as allyl acetate and allyl heptanoate;

Alkyl-vinyl or alkyl-allyl ethers, halogenated or not, such as cetylvinyl ether, dodecylvinyl ether, isobutylvinyl ether, ethylvinyl ether, 2-chlorovinyl ether, tetraallyloxy ethane;

Vinyl-alkyl-ketones such as vinylmethyl-ketone;

Unsaturated acids such as acrylic, methacrylic, α-chloroacrylic, crotonic, maleic, fumaric, itaconic, citraconic and senecioic acids, their anhydrides and their esters such as vinyl, allyl, methyl, butyl, isobutyl, hexyl, heptyl, 2-ethylhexyl, cyclohexyl, lauryl, stearyl or cellosolve acrylates and methacrylates, dimethyl maleate, ethyl crotonate, acid methyl maleate, acid butyl itaconate, glycol or polyalkylene glycol diacrylates and dimethacrylates such as ethylene glycol dimethacrylate or triethylene glycol dimethacrylate, dichloro-phosphate alkyl acrylates and methacrylates such as dichlorophosphate-ethyl methacrylate as well as bis-(methacryloyloxyethyl)-acid phosphate; and Acrylonitrile, methacrylonitrile, 2-chloro-acrylonitrile, 2-cyano-ethyl acrylate, methylene glutaronitrile, vinylidene cyanide, alkyl cyanoacrylates such as isopropyl cyanoacrylate, trisacryloyl hexahydro-s-triazine, vinyl trichlorosilane, vinyl trimethoxysilane and vinyl triethoxysilane.

Compounds possessing at least one ethylene linkage and at least one reactive group, i.e. a group capable of reacting with another monomer, another compound, or the substrate itself so as to establish a reticulation, may also be used as monomers (d). These reactive groups are well known and may be polar groups or functional groups such as the groups OH, $NH_2$, NH-alkyl, COOMe (Me=an alkali metal or alkaline earth metal), $SO_3H$,

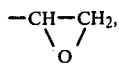

CHO,

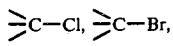

$-SO_2-$ $CH=CH_2$, $-NH-CO=CH=CH_2$. Monomers of this type which may be mentioned are hydroxyalkyl acrylates and methacrylates such as ethylene glycol monoacrylate, propylene glycol monomethacrylate, the acrylates and methacrylates of polyalkylene glycols, allyl alcohol, allyl glycolate, isobutenediol, allyloxy ethanol, o-allyl phenol, divinyl carbinol, glycerol α-allylether, acrylamide, methacrylamide, maleamide and maleimide, N-(cyanoethyl)-acrylamide, N-isopropylacrylamide, diacetone acrylamide, N-(hydroxy-methyl) acrylamide and methacrylamide, N-(alkoxymethyl) acrylamides and methacrylamides, glyoxal bis-acrylamide, sodium acrylate or methacrylate, vinylsulfonic and styrene-p-sulfonic acids and their alkaline salts, 3-amino-crotononitrile, monoallyl-amine, vinyl-pyridines, glycidyl acrylate or methacrylate, allyl glycidyl ether and acrolein.

The products according to the invention are themselves prepared in a known way by copolymerization of the monomers in solution in a solvent or in a mixture of solvents such as, for example, acetone, methylethylketone, γ-butyrolactone, methyl cyclohexanone, N-methyl 2-pyrrolidone, methanol, ethanol, isopropyl alcohol, butanol, ethyleneglycol, diacetone alcohol, phenylmethylcarbinol, isophorone, tetrahydrofuran, dioxan, ethyl acetate, glycol acetate, ethylene or polyethylene glycol monomethyl or monoalkyl ethers, formamide, dimethylformamide, acetonitrile, toluene, trifluorotoluene, trichlorotrifluoroethane. It is preferable to use solvents miscible with water such as acetone and isopropyl alcohol.

The operation is effected in the presence of suitable polymerization catalysts such as, for example, benzoyl peroxide, lauroyl peroxide, acetyl peroxide, succinyl peroxide, 2,2'-azo-bis-isobutyronitrile, 2,2'-azo-bis-(2,4-dimethyl-4-methoxyvaleronitrile), 4,4'-azo-bis-(4-cyano-pentanoic)-acid, azodicarbonamide, tert-butyl perpivalate. The amount of catalyst used may vary between 0.01 and 5%, preferably from 0.1 to 1.5%, with regard to the total weight of the monomers in use.

It is also possible to operate using a source of U.V. radiation in the presence of photo-initiators such as benzophenone, 2-methyl-anthraquinone or 2-chloro-thioxanthone.

The reaction temperature may vary within wide limits, that is between the ambient temperature and the boiling point of the reaction mixture. The operation is preferably effected at between 50° and 90° C.

If it is desired to control the molecular weight of the copolymers, it is possible to use chain transfer agents such as alkylmercaptans, for example tertiododecylmercaptan, n-dodecylmercaptan, n-octylmercaptan, carbon tetrachloride, triphenylmethane. The quantities to be used which are a function of the values which are to be obtained for the molecular weight, may vary from 0.01% to 3% with respect to the total weight of the monomers and preferably between 0.05% and 0.5%.

The possible salt formation of the copolymer can be made by means of strong or moderately strong inorganic or organic acids, that is, acids of which the dissociation constant or the first dissociation constant is greater than $10^{-5}$. For example, hydrochloric, hydrobromic, sulfuric, nitric, phosphoric, acetic, formic and propionic acids may be mentioned. Acetic acid is preferably used.

Instead of converting the copolymer into a salt, it may be quaternized by means of a suitable quaternizing agent such as, for example, methyl iodide, ethyl iodide, dimethyl sulfate, diethyl sulfate, benzyl chloride, trimethyl phosphate or methyl p-toluenesulfonate.

The solution of the copolymer obtained may if desired be diluted with the polymerization solvent or with another solvent or with a mixture of a solvent and water. If desired, the copolymer may also be isolated by elimination of the solvent or solvents.

The substrates capable of being made oil- and water-resistant with the products of the invention are principally papers, pasteboards, and comparable materials. Other very different materials may be mentioned such as, for example, woven or non-woven articles based on cellulose or regenerated cellulose, natural, artificial or synthetic fibers such as cotton, cellulose acetate, wool, silk, polyamide, polyester, polyolefin, polyurethane or polyacrylonitrile fibers, leather, plastics materials, glass, wood, metals, porcelain, masonry and painted surfaces.

In the case of papers and pasteboards, the solutions of the copolymers according to the invention are principally applied in aqueous medium, but also if desired in a solvent medium or in a mixture of water and solvents, according to the known techniques, for example by coating or covering, impregnation, immersion, spraying, brushing, foularding or layering.

On paper and in aqueous solution the products according to the invention may be applied either superficially on the already finished support, or in bulk, that is in the paper paste or pulp. The supports thus treated show good oil- and water-resistant properties after a simple drying at the ambient temperature or at a more elevated temperature, followed if desired with a heat treatment able to go up to 250° C. depending on the nature of the support.

In order to obtain a good fixation of the copolymers according to the invention on the substrates on which they are applied and further to confer a particular effect, it is sometimes advantageous to associate them with certain adjuvants, polymers, heat-condensable products and catalysts capable of assisting their reticulation with the support. As such may be mentioned the condensates or precondensates of urea or melamine formaldehyde, methylol dihydroxyethylene urea and its derivatives, urones, methylol-ethylene ureas, methylol-propylene ureas, methylol-triazones, condensates of dicyandiamide-formaldehyde, methylol-carbamates, methylol-acrylamides or methacrylamides, their polymers or copolymers, divinyl sulfone, polyamides, epoxy derivatives such as diglycidyl glycerol, epoxypropyl-trialkyl (aryl) ammonium halides such as (2,3-epoxy-propyl)-trimethylammonium chloride, N-methyl-N-(2,3-epoxy-propyl)-morpholinium chloride, certain halogen derivatives such as chloro-epoxypropane and dichloro-propanol, or polar compounds such as the disodium salt of trisulfato-oxyethyl-sulfonium-betaine and the pyridinium salt of the chloromethyl ether of ethylene glycol.

In order to evaluate the performances of the substrates treated according to the invention, the following tests have been used:

Test of ungreasability or "Kit value"

In Tappi, vol. 50, No. 10, pages 152A and 153A, standard RC 338 and UM 511, this test is described, which allows the ungreasability of the substrates to be measured by mixtures of castor oil, toluene and heptane. These contain variable quantities of these three products shown in Table 1.

TABLE 1

| Kit value | Volume of castor oil | Volume of toluene | Volume of heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The test consists in gently depositing on the treated paper drops of these mixtures. The drops are left on the paper for 15 seconds, then the appearance of the papers or pasteboard is observed and the wetting or penetration shown shown by a browning of the surface is noted. The number corresponding to the mixture containing the highest percentage of heptane, which does not penetrate or wet the paper, is the "kit value" of the paper and is considered as being the amount of oil-resistance of the paper treated. The higher the "kit value", the better is the oil-resistance of the paper.

Turpentine oil test

This test is described in Tappi, standard T 454, ts 66 (1966).

On the paper to be tested, itself placed on a white Bristol board, are deposited 5 g of Fontainebleau sand washed in acids, then 1.1 ml of anhydrous turpentine oil colored by 0.5 g per liter of Rouge Organol B S is poured on the sand. When the pouring of the oil is finished, a chronometer is started and the paper is shifted every 30 seconds on the Bristol board. The time passed is noted at the moment when the Bristol board is stained. After 30 minutes one can assume that the test is no longer significant and that the substrate tested shows excellent performances.

The test is effected on 7 samples of the same paper. The values found are noted from the smallest to the largest and the fourth value is taken as the mean value.

Test to measure the "barrier to solvents" effect

In anhydrous turpentine oil colored by 0.5 g/liter of Rouge Organol B S is immersed 1 cm in length of a rectangular test piece (10 cm × 1 cm) of the substrate to be tested. This immersion is carried out in a cylindrical 500 ml closed jar for a time of 24 hours. Then the surface of the stain formed by the mounting of the colored liquid into the portion of the substrate tested which was not immersed is measured in $mm^2$.

Test measuring the "barrier to water" effect 3 cm of the length of a rectangular test piece (10 cm × 1 cm) of the substrate to be tested are immersed in water colored by 0.5 g/liter of RHODAMINE B. This immersion is made in a cylindrical closed 500 ml jar for a time of 24 hours. The surface of the stain formed by mounting of the colored liquid into the portion of the tested substrate not immersed is then measured in $mm^2$.

COBB test

The COBB and LOWE test (Tappi Standard T 441) codified by the Committee for the Tests of the Central Laboratory of the Swedish Paper Industry (Project P.C.A. 13-59) consists in measuring the weight (in g) of water absorbed during one minute by a square meter of paper supporting a height of water of one centimeter.

Test of oil-resistance

On some supports, the oil-resistance has been measured by the method described in "AATCC Technical Manual", Test Method 118-1972, which evaluates the non-wettability of the substrate by a series of oily liquids of which the surface tensions are weaker and weaker (Textile Research Journal, May 1969, page 451).

Test of water-resistance

On some supports, the water resistance has been measured by the method described in "AATCC Technical Manual", Test Method 22-1971.

The following Examples, in which the parts and percentages are by weight unless the contrary is stated, illustrate the invention without it being restricted thereby. In the application Examples given a discharge rate or expression rate of x% indicates the weight of bath (x parts) retained by 100 parts of substrate.

EXAMPLE 1

20.4 parts of acetone, 45 parts of isopropyl alcohol, 8 parts of dimethylaminoethyl methacrylate, 16 parts of N-vinylpyrrolidone, 0.8 parts of 2,2'-azo-bis-isobutyronitrile and 81.6 parts of a mixture of polyfluoro monomers of the formula:

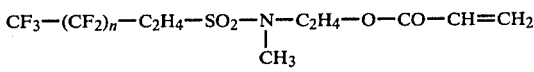

where n is equal to 3, 5, 7, 9, 11, 13 and 15 in the ratios of mean weight respectively of 1:50:31:10:3:1:1, are charged into a reactor having a capacity 1000 parts by volume, provided with a stirrer, a reflux condenser, a thermometer, an inlet tube for nitrogen and a heating device. Heating is effected at 75° C. for 15 hours under an atmosphere of nitrogen, then 160 parts of water, 250 parts of isopropyl alcohol and 8 parts of acetic acid are added. The mixture is then maintained for 2 hours at 75° C., and then cooled to the ambient temperature.

563 parts of a solution (S₁) are thus obtained of a copolymer according to the invention. This solution contains 18.8% of non-volatile material and its proportion of fluorine is 6.6%.

EXAMPLE 2

2a. Into an apparatus similar to that of Example 1 are charged 19.2 parts of acetone, 45 parts of isopropyl alcohol, 8 parts of dimethylaminoethyl methacrylate, 21 parts of N-vinylpyrrolidone, 0.8 parts of 2,2′-azo-bis-isobutyronitrile and 76.8 parts of the same mixture of polyfluoro monomers as in Example 1. The mixture is heated at 75° C. for 15 hours under a nitrogen atmosphere, then 160 parts of water, 250 parts of isopropyl alcohol and 8 parts of acetic acid are added, and it is maintained for a further 2 hours at 75° C., then cooled to the ambient temperature. 585 parts are thus obtained of a solution (S₂) of a copolymer according to the invention. This solution contains 18.2% of non-volatile materials and its proportion of fluorine is 6%.

2b. This copolymer and that obtained in Example 1 are tested with equal amounts of fluorine, comparatively with the following products:

(A) Copolymer based on 85% of the mixture of polyfluoro monomers as defined in Example 1 and 15% of dimethylaminoethyl methacrylate, salified and N-oxidized, prepared according to Example 1 of U.S. Pat. No. 4,147,851.

(B) Copolymer based on 70% of the mixture of polyfluoro monomers as defined in Example 1 and 30% of dimethylaminoethyl methacrylate, salified and N-oxidized, prepared according to Example 2 of U.S. Pat. No. 4,147,851.

(C) Phosphate of polyfluorinated alcohol of the formula:

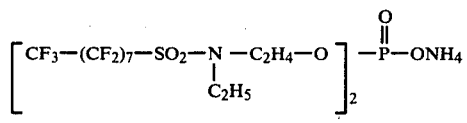

described in Example 5 of French Pat. No. 1,317,427.

These products are applied to a non-sized paper of which the characteristics are as follows:
Fibrous composition:
 60% of bleached KRAFT paste based on hard wood
 40% of bleached KRAFT paste based on soft wood
Refining on Hydrafiner 00° to 35° SR
Adjuvants introduced:
 talcum: 15%
 retention agent (RETAMINOL E of the BAYER company): 3%
Weight of paper: 70 to 71 g/m²
Humidity of the paper: 4 to 5%.

For this purpose five baths for size-press are prepared, each containing 0.7 g of fluorine per liter and having the composition (in g/liter) shown in the following Table 2.

TABLE 2

| Constituents of the bath (g/l) | No. 1 | No. 2 | No. 3 | No. 4 | No. 5 |
|---|---|---|---|---|---|
| Solution S₁ of Example 1 | 10.6 | | | | |
| Solution S₂ of Example 2 | | 11.6 | | | |

TABLE 2-continued

| Constituents of the bath (g/l) | No. 1 | No. 2 | No. 3 | No. 4 | No. 5 |
|---|---|---|---|---|---|
| Solution of copolymer A at 16.6% of non-volatile materials and 6.5% of fluorine | | | 10.8 | | |
| Solution of copolymer B at 15.3% of non-volatile materials and 4.9% of fluorine | | | | 14.4 | |
| Solution of compound C at 35.7% of non-volatile materials and 18.8% of fluorine | | | | | 3.8 |
| Water | 989.4 | 988.4 | 989.2 | 985.6 | 996.2 |
| TOTAL | 1,000 | 1,000 | 1,000 | 1,000 | 1,000 |

Five sheets on non-sized paper are treated in size-press respectively in these five baths with a discharge rate of 85%. After drying for 90 seconds at 110° C., papers are obtained showing An anti-grease character, a "water barrier" effect and a "barrier to solvents" effect more or less strong. Their characteristics are regrouped in the following Table 3, and compared to those of an untreated paper.

TABLE 3

| Characteristics | Paper treated with the bath | | | | | Untreated paper |
|---|---|---|---|---|---|---|
| | No. 1 | No. 2 | No. 3 | No. 4 | No. 5 | |
| Oil-resistance (Kit value) | 10 | 9 | 9 | 5 | 9 | 0 |
| Test with turpentine oil (in minutes or in seconds) | over 30 min. | over 30 min. | 10 min. | less than 30 sec. | over 30 min. | less than 30 sec. |
| "Water barrier" effect, surface of the stain (in mm²) | 36 | 50 | 207 | 477 | over 700 | over 700 |
| "Barrier to solvents" effect, surface of the stain (in mm²) | 0 | 30 | 140 | 780 | 155 | over 900 |

Examination of the results shown in Table 3 shows that the papers treated with the copolymers according to the invention (baths Nos. 1 and 2) possess not only an excellent anti-grease character, but also show remarkable "water barrier" and "barrier to solvents" effects.

2c. Five baths for size-press are prepared, each containing 1 g of fluorine per liter and having the composition (in g/liter) shown in the following Table 4.

Five sheets of unsized AFNOR VII paper weighing 77 g/m² are treated in size-press respectively with the five baths shown in Table 4 with a discharge rate of 95%. After drying for 90 seconds at 110° C., the papers thus treated and one untreated paper are subjected to the COBB test.

The results are regrouped in the following Table 5.

TABLE 4

| Constituents of the bath (g/l) | No. 6 | No. 7 | No. 8 | No. 9 | No. 10 |
|---|---|---|---|---|---|
| Solution S₁ of Example 1 | 15.1 | | | | |
| Solution S₂ of Example 2 | | 16.6 | | | |
| Solution of copolymer A at 16.6% of non-volatile materials | | | | | |

TABLE 4-continued

| Constituents of the bath (g/l) | No. 6 | No. 7 | No. 8 | No. 9 | No. 10 |
|---|---|---|---|---|---|
| and 6.5% of fluorine | | | | | |
| Solution of copolymer B at 15.3% of non-volatile materials and 4.9% of fluorine | | | 15.4 | | |
| Solution of compound C at 35.7% of non-volatile materials and 18.8% of fluorine | | | | 20.4 | |
| Water | 984.9 | 983.4 | 984.6 | 979.6 | 5.3 994.7 |
| TOTAL | 1,000 | 1,000 | 1,000 | 1,000 | 1,000 |

TABLE 5

| | Paper treated with the bath | | | | | Untreated paper |
|---|---|---|---|---|---|---|
| | No. 6 | No. 7 | No. 8 | No. 9 | No. 10 | |
| COBB Value | 20 | 20 | 30 | 30 | 160 | 160 |

Examination of Table 5 shows that the papers treated with the copolymers according to the invention (baths Nos. 6 and 7) possess an excellent degree of sizing.

EXAMPLE 3

25 Parts of acetone, 45 parts of isopropyl alcohol, 12 parts of dimethylaminoethyl methacrylate, 3 parts of N-vinyl pyrrolidone, 0.4 parts of 2,2'-azo-bis-isobutyronitrile and 100 parts of the same mixture of polyfluoro monomers as in Example 1 are charged into an apparatus identical with that of Example 1. The charge is heated at 75° C. for 17 hours under a nitrogen atmosphere, then 165 parts of water, 250 parts of isopropyl alcohol and 8 parts of acetic acid are added, and it is then maintained at 75° C. for a further 2 hours, then cooled to the ambient temperature. 589 parts are thus obtained of a solution ($S_3$) of a copolymer according to the invention. This solution contains 19.1% of non-volatile materials and its fluorine content is 7.8%.

When applied to the same paper and in the same conditions and proportions as in Example 2b (i.e., 9 g of solution $S_3$ per liter of bath), this copolymer confers the following characteristics on the paper:

| Oil-resistance (Kit value) | 9 |
|---|---|
| Turpentine oil test | over 30 minutes |
| "Water barrier" effect Surface of the stain. | 40 mm$^2$ |
| "Barrier to solvents" effect Surface of the stain. | 10 mm$^2$ |

EXAMPLE 4

20.5 parts of acetone, 45 parts of isopropyl alcohol, 13 parts of dimethylaminoethyl methacrylate, 5 parts of N-vinylpyrrolidone, 0.8 parts of 4,4'-azo-bis-(4-cyanopentanoic) acid and 82 parts of the same mixture of polyfluoromonomers as in Example 1 are charged into an apparatus identical with that of Example 1. The charge is heated at 75° C. for 4 hours under a nitrogen atmosphere, then 160 parts of water, 250 parts of isopropyl alcohol and 10 parts of acetic acid are added, and it is then maintained at 75° C. for a further 2 hours, then cooled to the ambient temperature. 580 parts are thus obtained of a solution ($S_4$) of a copolymer according to the invention. This solution contains 17.2% of non-volatile materials and its content of fluorine is 6.5%.

When applied to the same paper and in the same conditions and proportions as in Example 2b (i.e., 10.8 g of solution $S_4$ per liter of bath), this copolymer confers the following characteristics on the paper:

| Oil-resistance (kit value) | 9 |
|---|---|
| Turpentine oil test | over 30 minutes |

EXAMPLE 5

21.4 parts of acetone, 46 parts of isopropyl alcohol, 10 parts of dimethylaminoethyl methacrylate, 10 parts of N-vinylpyrrolidone, 0.8 parts of 2,2'-azo-bis-isobutyronitrile and 85.6 parts of the same mixture of polyfluorinated monomers as in Example 1 are charged into an apparatus identical with that of Example 1. The charge is heated at 70° C. for 22 hours under an atmosphere of nitrogen, and then 160 parts of water, 250 parts of isopropyl alcohol and 10 parts of acetic acid are added. The charge is maintained for a further hour at 70° C., then cooled to the ambient temperature. 530 parts are thus obtained of a solution ($S_5$) of a copolymer according to the invention. This solution contains 19.1% of non-volatile materials and its content of fluorine is 7.1%.

On mixing 0.42 g of solution $S_5$, 4 g of a dry "bleached bisulfite" paste and 156 g of water, an aqueous paste containing 0.03 g of fluorine is prepared. This past is then diluted with 4 liters of water in the bowl of a "Rapid-Kotten" machine. This is then agitated for 30 seconds, then filtered under vacuum. The paper mass thus obtained is dried in vacuo for 10 minutes at 90° C. on the plates or slabs of the "Rapid-Kotten" machine. A sheet of paper treated in the mass is finally obtained of which the characteristics appear in the following Table 6 compared with those of an untreated control sheet.

TABLE 6

| | Treated sheet | Control sheet |
|---|---|---|
| Oil-resistance (kit value) | 10 | 0 |
| Turpentine oil test | over 30 min. | less than 30 sec. |
| "Water barrier" effect Surface of the stain in (mm$^2$) | 65 | over 700 |
| "Barrier to solvents" effect Surface of the stain (in mm$^2$) | 0 | over 900 |
| COBB value | 29 | 168 |

EXAMPLE 6

A foularding bath is prepared composed of 40 parts of solution $S_1$ according to Example 1, 40 parts of an aqueous 65% solution of a precondensate of a trimethyl ether of hexamethylolmelamine, 4 parts of lactic acid and 916 parts of water. Three cloths of different composition: a cloth of acrylic fibers (DRALON), a cloth of polyester fiber (TERGAL) and a cloth of mixed polyester-cotton 66/33, are foularded in this bath with respective rates of expression of 112%, 87% and 70%. The cloths are then treated for 3 minutes at 165° C. in a BENZ thermocondenser.

The characteristics of the cloths thus treated (T) are indicated in the following Table 7 compared with those of the untreated control cloths (NT).

TABLE 7

| Characteristics | DRALON cloth | | TERGAL cloth | | Polyester/ cotton cloth | |
|---|---|---|---|---|---|---|
| | T | NT | T | NT | T | NT |
| Water-resistance (Spray test) Standard AATCC 22 - 1971 | 100 | 0 | 90 | 50 | 70 | 0 |
| Oil-resistance Standard AATCC 118 - 1972 | 6 | 0 | 5 | 0 | 5 | 0 |

Examination of the results of the above Table 7 shows that the cloths treated with the copolymers according to the invention possess an anti-stain character, that is they are capable of resisting lean and greasy stains.

EXAMPLE 7

100 g/m² of solution $S_2$ according to Example 2a are applied with a brush on two different leathers and they are left to dry for 24 hours at the ambient temperature. Leathers are obtained which show remarkably oil-resistant and water-resistant properties as are shown by the characteristics in the following Table 8.

TABLE 8

| Characteristics | BASANE sheepskin (vegetable tanning) | | White goat (chrome tanning) | |
|---|---|---|---|---|
| | treated | untreated | treated | untreated |
| Water-resistance (Spray test) (Standard AATCC 22 - 1971 | 100 | 0 | 100 | 0 |
| Oil-resistance Standard AATCC 118 - 1972 | 8 | 0 | 8 | 0 |

EXAMPLE 8

21.4 parts of acetone, 90 parts of isopropyl alcohol, 8 parts of dimethylaminoethyl methacrylate, 12 parts of N-vinylpyrrolidone, 0.8 parts of 4,4'-azo-bis-(4-cyanopentanoic) acid and 85.6 parts of the polyfluoro monomer of the formula below are charged into an apparatus identical with that of Example 1:

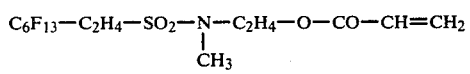

The charge is heated at 70° C. for 10 hours under an atmosphere of nitrogen, then 160 parts of water, 205 parts of isopropyl alcohol and 5 parts of acetic acid are added. The charge is then maintained at 70° C. for a further two hours, then cooled to the ambient temperature. 580 parts are thus obtained of a solution ($S_6$) of a copolymer according to the invention. This solution contains 17.6% of non-volatile materials and its content of fluorine is 6.5%.

When applied on the same paper and in the same conditions and proportions as in Example 2b (i.e., 10.8 g of solution $S_6$ per liter of bath), this copolymer confers on the paper the following characteristics:

| Oil-resistance (kit value) | 9 |
|---|---|
| Turpentine oil test | over 30 minutes |

EXAMPLE 9

A plank of oak wood is coated by means of a brush with 100 g/m² of solution $S_5$ described in Example 5 and it is left to dry for 24 hours at the ambient temperature.

The water-resistant effect of the support thus treated is measured by depositing on the surface of the wood some drops of each of the 7 solutions shown in Table 9.

TABLE 9

| Quotation of the water-resistance effect | Composition of the test solutions (in %) |
|---|---|
| 7 | 100 2-propanol |
| 6 | 50/50 2-propanol/water |
| 5 | 30/70 2-propanol/water |
| 4 | 20/80 2-propanol/water |
| 3 | 10/90 2-propanol/water |
| 2 | 5/95 2-propanol/water |
| 1 | 2/98 2-propanol/water |

The quotation in the table corresponds to the number of the solution the most rich in isopropyl alcohol which does not wet the support. This wetting is shown by a total penetration of the liquid or by a browning of the surface in contact with the liquid.

The oil-resistant effect is measured by using solutions of the standard AATCC 118-1972. Several drops of each of the solutions are deposited on the surface of the wood. The marking corresponds to the number of the solution with the lowest surface tension, which does not penetrate into the support or for which no browning of the surface in contact with the liquid is observed.

Compared with an untreated wood, the characteristics are as in Table 10.

TABLE 10

| | Treated wood | Untreated wood |
|---|---|---|
| Water-resistance | 6 | 0 |
| Oil-resistance | 6 | 0 |

EXAMPLE 10

14.2 parts of acetone, 45 parts of isopropyl alcohol, 3 parts of dimethylaminoethyl methacrylate, 40 parts of N-vinylpyrrolidone, 0.8 parts of 4,4'-azo-bis-(4-cyanopentanoic) acid and 56.8 parts of the same mixture of polyfluorinated monomers as in Example 1 are charged into an apparatus identical with that of Example 1. The charge is heated at 80° C. for 4 hours under an atmosphere of nitrogen, then 160 parts of water, 160 parts of isopropyl alcohol and 2 parts of acetic acid are added. The charge is maintained for a further hour at 80° C., then cooled to the ambient temperature. 460 parts are thus obtained of a solution ($S_7$) of a copolymer according to the invention. This solution contains 21.2% of non-volatile materials and its content of fluorine is 5.5%.

When applied on the same paper and under the same conditions as in Example 2b, but at the rate of 0.8 g of fluorine per liter of bath (i.e., 14.5 g of solution $S_7$ per liter of bath), this copolymer confers on the paper the following characteristics:

| Oil-resistance (kit value) | 9 |
| --- | --- |
| Turpentine oil test | over 30 minutes |

EXAMPLE 11

45 parts of isopropyl alcohol, 4 parts of dimethylaminoethyl methacrylate, 6 parts of N-vinyl-pyrrolidone, 0.4 parts of 4,4'-azo-bis-(4-cyano-pentanoic) acid and 40 parts of the polyfluorinated monomer of the formula:

$$C_8F_{17}-C_2H_4-O-CO-CH=CH_2$$

are charged into an apparatus identical with that of Example 1.

The charge is heated at 70° C. for 24 hours under an atmosphere of nitrogen, then 80 parts of water, 100 parts of isopropyl alcohol and 2 parts of acetic acid are added, and the charge is maintained at 80° C. for a further hour, then cooled to the ambient temperature. 275 parts are thus obtained of a solution ($S_8$) of a copolymer according to the invention. This solution contains 17.8% of non-volatile materials and its content of fluorine is 8.8%.

In a foularding bath composed of 10 parts of solution ($S_8$) and 990 parts of water, a non-woven material (dry method) of polyester weighing 200 g/m² is foularded with a rate of expression of 250%, then dried for 3 minutes at 165° C. in a BENZ thermocondenser.

The characteristics of the non-woven material thus treated are indicated in the following Table 11 compared to a non-woven untreated control material.

TABLE 11

| | Non-woven polyester | |
| --- | --- | --- |
| | Treated | Untreated |
| Water-resistance measured as indicated in Example 9 | 5 | 2 |
| Oil-resistance Standard AATCC 118 - 1972 | 6 | 0 |
| "Water-barrier" effect (Surface of the stain in mm²) | 0 | 70 |
| "Barrier to solvents" effect (Surface of the stain in mm²) | 20 | 250 |

EXAMPLE 12

21.3 parts of acetone, 45 parts of isopropyl alcohol, 14 parts of dimethylaminoethyl methacrylate, 1 part of N-vinylpryyolidone, 0.8 parts of 4,4'-azo-bis-(4-cyano-pentanoic) acid and 85 parts of the polyfluorinated monomer of the formula:

$$C_6F_{13}-C_2H_4-SO_2-\underset{\underset{CH_3}{|}}{N}-C_2H_4-O-CO-CH=CH_2$$

are charged into an apparatus identical with that of Example 1.

The charge is heated at 70° C. for 6 hours under an atmosphere of nitrogen, then 160 parts of water, 160 parts of isopropyl alcohol and 8 parts of acetic acid are added. The charge is maintained at 70° C. for a further hour, then cooled to the ambient temperature. 490 parts are thus obtained of a solution ($S_9$) of a copolymer according to the invention. This solution contains 20% of non-volatile materials and its content of fluorine is 7.8%.

In a foularding bath composed of 10 parts of solution $S_9$ and 990 parts of water, a cellulosic non-woven material (damp method) weighing 46 g/m² is foularded, with a rate of expression of 150%, then dried for 3 minutes at 165° C. in a BENZ thermocondenser.

The characteristics of the non-woven material thus treated are indicated in the following Table 12 compared with a non-woven untreated control material.

TABLE 12

| | Non-woven cellulosic material | |
| --- | --- | --- |
| | Treated | Untreated |
| Oil-resistance (kit value) | 9 | 0 |
| Turpentine oil test | over 30 minutes | less then 30 seconds |
| "Barrier to water" effect (Surface of the stain in mm²) | 10 | over 700 |
| "Barrier to solvents" effect (Surface of the stain in mm²) | 0 | over 900 |

EXAMPLE 13

20.4 parts of acetone, 45 parts of isopropyl alcohol, 6 parts of dimethylaminoethyl methacrylate, 16 parts of N-vinylpyrrolidone, 2 parts of ethylene glycol monomethacrylate, 0.8 parts of 4,4'-azo-bis-(4-cyano-pentanoic) acid and 81.6 parts of the same mixture of polyfluorinated monomers as in Example 1 are charged into an apparatus identical with that of Example 1. The charge is heated at 80° C. for 4 hours under an atmosphere of nitrogen, then 160 parts of water, 250 parts of isopropyl alcohol and 6 parts of acetic acid are added. The charge is maintained at 80° C. for a further 2 hours, then cooled to the ambient temperature. 583 parts are thus obtained of a solution ($S_{10}$) of a copolymer according to the invention. This solution contains 18.1% of non-volatile materials and its content of fluorine is 6.4%.

When applied on the same paper and under the same conditions and proportions as in Example 2b (i.e., 11 g of solution $S_{10}$ per liter of bath), this copolymer confers on the paper the following characteristics:

| Oil-resistance (kit value) | 9 |
| --- | --- |
| Turpentine oil test | over 30 minutes |

EXAMPLE 14

18.4 parts of acetone, 50 parts of isopropyl alcohol, 8 parts of tert-butylaminoethyl methacrylate, 16 parts of N-vinylpyrrolidone, 0.8 parts of 4,4'azo-bis-(4-cyano-pentanoic) acid and 73.6 parts of the same mixture of polyfluoro monomers as in Example 1 are charged into an apparatus identical with that of Example 1. The charge is heated at 80° C. for 6 hours under a nitrogen atmosphere, then 160 parts of water, 250 parts of isopropyl alcohol and 4 parts of acetic acid are added, and it is then maintained at 80° C. for a further hour, then cooled to the ambient temperature. 560 parts are thus obtained of a solution ($S_{11}$) of a copolymer according to the invention. This solution contains 17.3% of non-volatile materials and its fluorine content is 6%.

When applied to the same paper and in the same conditions and proportions as in Example 2b (i.e. 11.6 g of solution $S_{11}$ per liter of bath), this copolymer confers the following characteristics on the paper:

| Oil-resistance (Kit-value) | 9 |
|---|---|
| Turpentine oil test | over 30 minutes |

EXAMPLE 15

18.7 parts of acetone, 50 parts of isopropyl alcohol, 12 parts of dimethylaminoethyl methacrylate, 10 parts of N-vinylpyrrolidone, 6 parts of vinyl acetate, 0.8 parts of 4,4'-azo-bis-(4-cyano-pentanoic) acid and 74.7 parts of the same mixture of polyfluoro monomers as in Example 1 are charged into an apparatus identical with that of Example 1. The charge is heated at 80° C. for 6 hours under a nitrogen atmosphere, then 160 parts of water, 250 parts of isopropyl alcohol and 12 parts of acetic acid are added, and it is then maintained at 80° C. for a further hour, then cooled to the ambient temperature. 572 parts are thus obtained of a solution ($S_{12}$) of a copolymer according to the invention. This solution contains 17.6% of non-volatile materials and its fluorine content is 5.9%.

When applied to the same paper and in the same conditions and proportions as in Example 2b (i.e. 11.8 g of solution $S_{12}$ per liter of bath), this copolymer confers the following characteristics on the paper:

| Oil-resistance (Kit-value) | 9 |
|---|---|
| Turpentine oil test | over 30 minutes |

What is claimed is:
1. A fluorinated copolymer which comprises:
(a) 35 to 98% by weight of one or more polyfluorinated monomers of the formula:

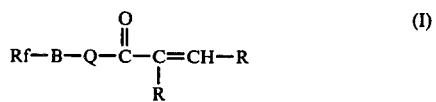

in which Rf represents perfluoroalkyl with a straight or branched chain containing 2 to 20 carbon atoms, Q represents oxygen or sulfur, B represents a bivalent chain selected from:

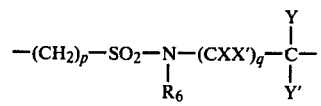

—$(CH_2)_p$—,
—$(CH_2)_p$—O—$(CH_2)_r$—,
—$(CH_2)_p$—S—$(CH_2)_r$—,
—$(CH_2)_p$—$(OCH_2CH_2)_r$—,
—$(CH_2)_p$—$SO_2$—$(CH_2)_r$—,
—CH=CH—$(CH_2)_p$—,

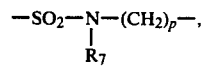

—COO—$(CH_2)_p$— or

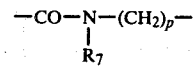

in which p is a whole number from 1 to 20, q is a whole number from 1 to 4, r is a whole number from 1 to 20, $R_6$ is hydrogen, alkyl containing 1 to 10 carbon atoms, cycloalkyl containing 5 to 12 carbon atoms, hydroxyalkyl containing 2 to 4 carbon atoms, aryl or aryl substituted by alkyl containing 1 to 6 carbon atoms, $R_7$ is hydrogen or alkyl containing 1 to 4 carbon atoms, X, X', Y and Y' are the same or different and each represents hydrogen or alkyl containing 1 to 4 carbon atoms, one of the symbols R represents hydrogen and the other hydrogen or alkyl containing 1 to 4 carbon atoms;

(b) 1 to 15% by weight of one or more monomers of the formula:

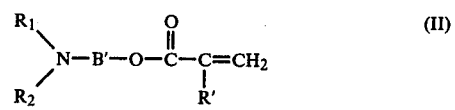

in which B' represents linear or branched alkylene containing 1 to 4 carbon atoms, R' represents hydrogen or alkyl containing 1 to 4 carbon atoms, $R_1$ represents alkyl containing 1 to 18 carbon atoms, hydroxyethyl or benzyl, $R_2$ represents hydrogen or alkyl containing 1 to 18 carbon atoms, hydroxyethyl or benzyl or $R_1$ and $R_2$ together with the nitrogen form morpholino, piperidino or pyrrolidinyl-1;

(c) 1 to 50% by weight of one or more pyrrolidone monomers of the formula:

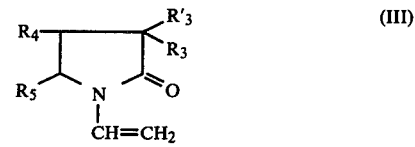

in which $R_3$, $R'_3$, $R_4$ and $R_5$ are the same or different and each represents hydrogen or alkyl containing 1 to 4 carbon atoms; and (d) up to 10% by weight of a monomer other than the monomers of formulae (I), (II) and (III), which is copolymerizable with said monomers of formulae (I), (II) and (III), and, optionally, its salt form obtained by salifying with an acid having a dissociation constant or first dissociation constant greater than $10^{-5}$, or its form obtained by quaternizing by means of a quaternizing agent.

2. A copolymer according to claim 1 comprising 69 to 93% by weight of one or more polyfluorinated monomers of formula (I), 5 to 11% by weight of one or more monomers of formula (II), 2 to 20% by weight of one or more monomers of formula (III), and 0 to 5% by weight of another monomer.

3. A copolymer according to claim 2 comprising 7 to 10% by weight of one or more monomers of formula (II).

4. A copolymer according to claim 1, 2 or 3 in which the monomer of formula (III) is N-vinyl-2-pyrrolidone.

5. A copolymer according to claim 4 in which the polyfluoro monomer or monomers have the formula:

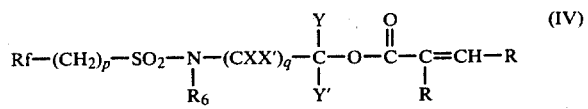

in which Rf and R have the same significance as in claim 1, p represents a whole number from 1 to 20, q represents a whole number from 1 to 4, $R_6$ represents hydrogen or alkyl containing 1 to 10 carbon atoms, cycloalkyl containing 5 to 12 carbon atoms, hydroxyalkyl containing 2 to 4 carbon atoms, aryl or aryl substituted by alkyl containing 1 to 6 carbon atoms, X, X', Y and Y' are the same or different and each represents hydrogen or alkyl containing 1 to 4 carbon atoms.

6. A copolymer according to claim 5 obtained from a mixture of monomers of formula (IV) having different Rf radicals.

7. A copolymer according to claim 6 in which the monomer of formula (II) is dimethylaminoethyl methacrylate.

8. A copolymer according to claim 5 in which the monomer of formula (II) is dimethylaminoethyl methacrylate.

9. A copolymer according to claim 4 in which the monomer of formula (II) is dimethylaminoethyl methacrylate.

* * * * *